(12) United States Patent
Vey et al.

(10) Patent No.: US 7,935,203 B2
(45) Date of Patent: May 3, 2011

(54) BACKFIXING OF ARTIFICIAL TURF STOCK MATERIAL WITH HOTMELTS BASED ON AMORPHOUS POLY-α-OLEFINS AND/OR MODIFIED AMORPHOUS POLY-α-OLEFINS

(75) Inventors: Marlies Vey, Marl (DE); Lutz Mindach, Bochum (DE); Hans-Dieter Zagefka, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 623 days.

(21) Appl. No.: 11/917,104

(22) PCT Filed: Apr. 18, 2006

(86) PCT No.: PCT/EP2006/061644
§ 371 (c)(1), (2), (4) Date: Dec. 10, 2007

(87) PCT Pub. No.: WO2006/131417
PCT Pub. Date: Dec. 14, 2006

(65) Prior Publication Data
US 2008/0213515 A1      Sep. 4, 2008

(30) Foreign Application Priority Data

Jun. 10, 2005  (DE) .................. 10 2005 026 765

(51) Int. Cl.
C08F 210/00 (2006.01)
C08J 5/12 (2006.01)
C09J 123/00 (2006.01)
E01C 13/08 (2006.01)

(52) U.S. Cl. ............... 156/72; 428/95; 526/348; 525/70
(58) Field of Classification Search ........... 156/72; 428/95; 526/348; 525/70
See application file for complete search history.

(56) References Cited

U.S. PATENT DOCUMENTS

| | | | |
|---|---|---|---|
| 3,661,687 A * | 5/1972 | Spinney et al. ............ 428/17 |
| 4,221,696 A | 9/1980 | Cook et al. | |
| 4,309,522 A | 1/1982 | Dietrich et al. | |
| 4,719,260 A | 1/1988 | Stuart et al. | |
| 5,512,625 A | 4/1996 | Butterbach et al. | |
| 5,565,511 A | 10/1996 | Braud et al. | |
| 6,552,154 B1 | 4/2003 | Kohlstruk et al. | |
| 6,586,543 B1 | 7/2003 | Wey et al. | |
| 6,730,628 B2 | 5/2004 | Kohlstruk et al. | |
| 6,794,482 B2 | 9/2004 | Gloeckner et al. | |
| 6,797,787 B2 | 9/2004 | Scholz et al. | |
| 6,800,714 B2 | 10/2004 | Kohlstruk et al. | |
| 6,881,785 B2 | 4/2005 | Glockner et al. | |
| 7,005,002 B2 | 2/2006 | Glockner et al. | |
| 7,014,886 B2 | 3/2006 | Vey et al. | |
| 7,033,522 B2 | 4/2006 | Jonderko et al. | |
| 7,101,958 B2 | 9/2006 | Gloeckner et al. | |
| 7,135,522 B2 | 11/2006 | Gloeckner et al. | |
| 7,138,465 B2 | 11/2006 | Gloeckner et al. | |
| 7,144,975 B2 | 12/2006 | Gloeckner et al. | |
| 7,183,372 B2 | 2/2007 | Andrejewski et al. | |
| 7,199,166 B2 | 4/2007 | Gloeckner et al. | |
| 2004/0052952 A1 * | 3/2004 | Vey et al. ................ 427/385.5 |
| 2004/0122172 A1 | 6/2004 | Glockner et al. | |
| 2004/0234719 A1 | 11/2004 | Jones | |
| 2005/0010016 A1 | 1/2005 | Glockner et al. | |
| 2005/0043501 A1 | 2/2005 | Glockner et al. | |
| 2006/0074217 A1 | 4/2006 | Gloeckner et al. | |
| 2007/0123661 A1 | 5/2007 | Glockner et al. | |

FOREIGN PATENT DOCUMENTS

| | | |
|---|---|---|
| DE | 199 44 225 | 3/2000 |
| EP | 0 442 045 | 8/1991 |
| WO | 99/28557 | 6/1999 |

OTHER PUBLICATIONS

U.S. Appl. No. 12/158,800, filed Jun. 23, 2008, Gloeckner, et al.
U.S. Appl. No. 12/159,097, filed Jun. 25, 2008, Gloeckner, et al.
U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 11/911,421, filed Oct. 12, 2007, Becker, et al.
U.S. Appl. No. 10/586,587, filed Jul. 20, 2006, Gloeckner, et al.
U.S. Appl. No. 11/587,792, filed Sep. 18, 2007, Gloeckner, et al.
U.S. Appl. No. 11/631,392, filed Dec. 29, 2006, Gloeckner, et al.

(Continued)

Primary Examiner — Jeffrey C Mullis
(74) Attorney, Agent, or Firm — Oblon, Spivak, McClelland, Maier & Neustadt, L.L.P.

(57) ABSTRACT

Artificial turf stock materials useful for artificial turf stock backfixing, including: a hotmelt made of: a) from 5% to 100% by weight of at least one amorphous poly-α-olefin, b) from 0% to 100% by weight of at least one modified amorphous poly-α-olefin, c) from 0% to 40% by weight of at least one resin, d) from 5% to 15% by weight of at least one modified crystalline polypropylene, e) from 0% to 20% by weight of at least one crystalline polyolefin, f) from 0% to 80% by weight of fillers or pigments, g) from 0% to 20% by weight of at least one flame retardant, and h) from 0% to 20% by weight of at least one wax, where ribbon yarn of polyethylene, polypropene, polyester, polymide, or an interpolymer is bound together with the hotmelt in an artificial turf stock material.

22 Claims, No Drawings

OTHER PUBLICATIONS

U.S. Appl. No. 11/574,197, filed Feb. 23, 2007, Gloeckner, et al.
U.S. Appl. No. 11/573,212, filed Jun. 14, 2007, Gloeckner, et al.
U.S. Appl. No. 11/632,303, filed Jan. 12, 2007, Andrejewski, et al.
U.S. Appl. No. 11/574,113, filed Feb. 22, 2007, Gloeckner, et al.
U.S. Appl. No. 11/577,955, filed Apr. 25, 2007, Gloeckner, et al.
U.S. Appl. No. 11/577,415, filed Apr. 18, 2007, Gloeckner, et al.
U.S. Appl. No. 11/814,306, filed Oct. 30, 2007, Gloeckner, et al.
U.S. Appl. No. 11/577,139, filed Apr. 12, 2007, Gloeckner, et al.
U.S. Appl. No. 11/909,098, filed Sep. 19, 2007, Spyrou, et al.
U.S. Appl. No. 11/911,394, filed Oct. 12, 2007, Becker, et al.
U.S. Appl. No. 12/746,091, filed Jun. 3, 2010, Becker, et al.
U.S. Appl. No. 12/863,716, filed Jul. 20, 2010, Becker, et al.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/830,889, filed Jul. 6, 2010, Becker, et al.

* cited by examiner

BACKFIXING OF ARTIFICIAL TURF STOCK MATERIAL WITH HOTMELTS BASED ON AMORPHOUS POLY-α-OLEFINS AND/OR MODIFIED AMORPHOUS POLY-α-OLEFINS

CROSS REFERENCE TO RELATED APPLICATION

This application is a 371 of PCT/EP06/061644, filed on Apr. 18, 2006, and claims priority to German Patent Application No. 10 2005 026 765.3, filed on Jun. 10, 2005.

This invention relates to the backfixing of artificial turf stock material with hotmelts based on amorphous poly-α-olefins and/or modified amorphous poly-α-olefins, to a process to production thereof and to the use of hotmelts based on amorphous poly-α-olefins and/or modified amorphous poly-α-olefins for backfixing artificial turf stock material.

Ribbon yarns of artificial turf stock material, consisting of polyethene or polypropene or alternatively of polyester or polyamide or interpolymers, have hitherto mainly been attached using waterborne systems such as for example SBR latex filled with different amounts of chalk.

When using aqueous systems for binding or bonding, the water has to be evaporated after the coating step. The evaporation of water is accomplished, at appreciable expense in terms of time and energy, in drying ducts up to 60 to 80 m in length.

Polyurethanes are also used in some instances to attach pile tufts. High material costs and costly regulations governing the transportation of the isocyanate are disadvantages of this system.

Varietally pure recycling is not possible with prior art products.

It is an object of the present invention to provide a method of backfixing artificial turf stock materials in a simple and effective manner without the disadvantages associated with the use of latex or polyurethanes.

We have found that this object is achieved by the use of hotmelts based on amorphous poly-α-olefins and/or modified amorphous poly-α-olefins for backfixing.

The present invention accordingly provides an artificial turf stock material characterized in that it contains a hotmelt based on amorphous poly-α-olefins and/or modified amorphous poly-α-olefins for backfixing.

The present invention also provides a process for backfiring of artificial turf stock material, characterized in that a hotmelt based on amorphous poly-α-olefins and/or modified amorphous poly-α-olefins is used.

The present invention also provides for the use of hotmelts based on amorphous poly-α-olefins and/or modified amorphous poly-α-olefins for backfixing of artificial turf stock material.

An important feature in accordance with the present invention is that the binding of the tufted ribbons of the artificial turf stock material is effected by complete or else only partial coating with the hotmelt on the backside of the artificial turf stock material.

The use of hotmelts based on amorphous poly-α-olefins and/or modified amorphous poly-α-olefins has appreciable advantages over established methods of backfiring artificial turf stock material. The absence of a drying step means there is no need for the use of long drying ducts. The coating equipment can be made appreciably more compact. Because the drying step is no longer necessary, there is no need to use long drying ducts and to work up the water of condensation. As well as the lower capital costs, the ongoing costs of such a process are appreciably lower, since to formulate and apply a hotmelt requires only a fraction of the energy needed to evaporate from 400 to 600 g of water per m² of artificial turf.

Preference is given to an artificial turf stock material characterized in that a hotmelt comprising from 20% to 100% by weight of substantially amorphous poly-α-olefin and/or modified amorphous poly-α-olefins is applied as a melt uniformly to the backside of the artificial turf stock material so as to obtain an add-on weight in the range from 100 to 2000 g/m², the melt viscosity of the coating composition at 190° C. being in the range from 300 mPas to 30 000 mPas.

The hotmelt generally has the following composition:
a) from 0% to 100% by weight of at least one substantially amorphous poly-α-olefin,
b) from 0% to 100% by weight of at least one modified amorphous poly-α-olefin,
c) from 0% to 40% by weight of at least one resin,
d) from 0% to 20% by weight of at least one modified crystalline polypropylene,
e) from 0% to 20% by weight of at least one crystalline polyolefin,
f) from 0% to 80% by weight of fillers or pigments,
g) from 0% to 20% by weight of at least one flame retardant,
h) from 0% to 20% by weight of at least one wax.

The melt viscosity of the hotmelt at 190° C., measured in a rotary viscometer in accordance with DIN 53019, is in the range from 300 mPas to 30 000 mPas, preferably in the range from 600 mPas to 20 000 mPas, more preferably in the range from 800 to 10 000 mPas and even more particularly in the range from 1000 to 7000 mPas. The hotmelt is applied uniformly to the back side of the artificial turf stock material so as to obtain an add-on weight in the range from 100 to 2000 g/m², preferably in the range from 200 to 1500 g/m² and more preferably in the range from 300 to 1000 g/m².

The substantially amorphous poly-α-olefin a) has in particular the following monomer composition:
from 0% to 20% by weight and preferably from 0.1% to 15% by weight of ethene,
from 0% to 100% by weight and preferably from 20% to 95% by weight of propene, and
from 0% to 100% by weight and preferably from 0.1% to 80% by weight of a linear and/or branched α-olefin monomer having from 4 to 20 carbon atoms, particularly preferred (co)monomers being 1-butene, 1-pentene, 1-hexene, 1-heptene, 1-octene, 1-decene, 1-dodecene and 1-octadecene.

Examples of substantially amorphous poly-α-olefins according to the present invention include, but are not limited to, atactic polypropylene (APP), atactic poly-1-butene, propene-ethene copolymers, propene-1-butene copolymers, 1-butene-ethene copolymers and propene-1-butene-ethene terpolymers.

A preferred embodiment utilizes a substantially amorphous poly-α-olefin having a softening point (ring and ball method as per DIN EN 1427) between 70 and 165° C., a melt viscosity (to DIN 53019) between 300 and 200 000 mPas at 190° C., a density of less than 0.90 g/cm³ and a 100/25/5 needle penetration as per DIN EN 1426 between 3 and 50×0.1 mm. Appropriate polymers can be prepared by controlled polymerization in accordance with the prior art.

The crystalline fraction of the substantially amorphous poly-α-olefin may be estimated for example by determining the enthalpy of fusion by means of the DSC method (to DIN 53765). A weighed sample is first heated from −100° C. to +210° C. at a heating rate of 10° C./min and then cooled back down to −100° C. at a rate of 10° C./min. After the thermal history of the sample has been eliminated in this manner, it is once again heated at a rate of 10° C./min to 210° C. and the melting peak which is attributable to the crystallite melting point $T_m$ is integrated to determine the sample's enthalpy of fusion. For the purposes of the present invention, the enthalpy of fusion of the substantially amorphous poly-α-olefin is not more than 100 J/g, preferably not more than 60 J/g and more preferably not more than 40 J/g. The lower limit for the enthalpy of fusion is 1 J/g, preferably 2 J/g and more preferably 4 J/g.

The fraction of the hotmelt that is attributable to the substantially amorphous poly-α-olefin a), if used, is preferably in the range from 5% to 100% by weight and more preferably in the range from 20% to 97% by weight.

Useful modified amorphous poly-α-olefins b) include those having maleic anhydride and/or silane functionalization, in particular silane-modified polypropylene, silane-modified poly-1-butene, silane-modified propene-ethene copolymers, silane-modified propene-1-butene copolymers, silane-modified 1-butene-ethene copolymers, silane-modified propene-1-butene-ethene terpolymers and/or (maleic anhydride) MA-modified propene-ethene copolymers, MA-modified polypropylene, MA-modified propene-1-butene copolymers, MA-modified 1-butene-ethene copolymers, MA-modified propene-1-butene-ethene terpolymers. It will be appreciated that mixtures of various poly-α-olefins and modified poly-α-olefins can be used as well.

The fraction of hotmelt that is attributable to the modified amorphous poly-α-olefin b), if used, is preferably in the range from 5% to 100% by weight and more preferably in the range from 30% to 70% by weight.

The resin of component c) is for example a natural or synthetic terpene resin, a modified terpene resin, a rosin, a coumarone-indene resin, an aliphatic, aliphatic-aromatic or aromatic-modified hydrocarbonaceous resin, a liquid resin, a hydrogenated cyclic hydrocarbonaceous resin or an ester resin such as for example a fully or partially hydrogenated rosin glyceryl ester resin or a hydrogenated pentaerythrityl ester of a rosin. But it is also possible to use any other resin that is fully or partially compatible with poly-α-olefins.

The resin c) content of the hotmelt is preferably in the range from 0.1% to 35% by weight and more preferably in the range from 5% to 30% by weight.

The modified crystalline polypropylene of component d) is generally a polypropylene modified with maleic anhydride. It is similarly possible to use polypropylenes that are modified with (meth)acrylic acid.

The fraction of the hotmelt that is attributable to component d), if used, is preferably in the range from 1% to 15% by weight and more preferably in the range from 2% to 10% by weight.

The crystalline polyolefin of component e) is particularly suitably an isotactic polypropylene or an isotactic poly-1-butene. Copolymers can be used as well as homopolymers, examples being propene-1-butene copolymers, ethene-propene random copolymers or ethene-propene block copolymers.

The fraction of the hotmelt attributable to component e), if used, is preferably in the range from 1% to 15% by weight and more preferably in the range from 2% to 10% by weight.

The fillers or pigments of component f) may be for example carbon black, calcium carbonate, barium sulfate, aluminum oxide, aluminum hydroxide or magnesium hydroxide (which may each also act as a flame retardant), graphite, organic or inorganic color pigments or white pigments.

If used, they are used in an amount which is preferably in the range from 0.05% to 70% by weight and more preferably in the range from 1% to 60% by weight.

The flame retardant of component g) may be any flame retardant customary for polyolefin molding compositions. Brominated or phosphorous flame retardants are particularly suitable. If used, the flame retardant is preferably present in the coating composition in an amount from 0.05% to 10% by weight.

Wax h) may be any customary polyethylene wax or polypropylene wax, examples being Fischer-Tropsch waxes or polyethylene paraffins as obtained either by polymerization of ethylene or by degradation of higher molecular weight polyethylenes, fully refined paraffins or microcrystalline petroleum paraffins. The fraction of the coating composition that is attributable to wax, if used, is preferably in the range from 0.1% to 15% by weight and more preferably in the range from 2% to 12% by weight.

To meet specific performance requirements, the coating composition may additionally contain a total of not more than 30% by weight of other additives such as for example ethylene-vinyl acetate copolymer, polyisobutene, rubber (EPM, EPDM, SEBS), mineral oil, stabilizers and/or antistats.

The softening point of the hotmelt, measured using the ring and ball method, is preferably not less than 80° C., more preferably not less than 85° C. and even more preferably not less than 90° C. and preferably not more than 165° C., more preferably not more than 150° C. and even more preferably not more than 140° C.

The hotmelt may be applied for example to the backside of the artificial turf stock material by doctor coating, spray coating, roller coating or using a wide slot die. The coating temperature is above the softening temperature of the coating composition and is generally in the range from 100 to 190° C.; it obviously also depends on the material of the artificial turf to be coated. In the case of an artificial turf stock material composed of polyethylene or polypropylene fiber, it is particularly advantageous to operate at a coating temperature in the range from 140 to 160° C., whereas artificial turf stock material that has a higher melting point, for example PA66, in principle also permits coating temperatures of more than 170° C.

The coating weight required is especially dependent on the thickness of the ribbon yarns.

If desired, the backing may be fixed in the same operation as a nonwoven, a felt or a foam, each of which may consist of a multiplicity of different materials, is laminated on. If desired, the same coating system may be employed to also apply a heavy-duty coating material following the backfixing.

The exclusive use of varietally pure raw materials in the hotmelt used according to the present invention distinctly facilitates the recycling of the artificial turfs, which may consist of polyethylene, polypropylene or polyamide, for example. In the case of polyethylene or polypropylene artificial turf material, polymer-varietally pure recycling is possible.

Together with the energy savings over latex coating, the present invention can be considered an economical environment- and resource-conserving alternative to the present state of the art.

The present invention will now be more particularly described by way of example.

EXAMPLES

1. Preparation of Hotmelts 1.1 Hotmelt 1
1.1.a The following substances were melted together at 190° C. in an oil-heated stirred tank:

42.5 parts by weight of a substantially amorphous propene-rich poly-α-olefin a) having a melt viscosity of 8000 mPas/190° C. (VESTOPLAST® 708; 25° C. needle penetration of 20 0.1 mm; softening point 106° C.) and also 42.5 parts by weight of a substantially amorphous butene-rich poly-α-olefin a) having a melt viscosity of 8000 mPas/190° C. (VESTOPLAST® 508; 25° C. needle penetration of 14 0.1 mm; softening point 84° C.)

5 parts by weight of an MA-modified polypropylene d) [Exxelor® PO 1015 having an MFR (2.16 kg, 230° C.) of 160 g/10 min] were admixed.

This was followed by the portioned metered addition of 10 parts by weight of an aliphatic hydrocarbonaceous resin (EASTOTAC® H130, viscosity 1000 mPas/190° C.; softening point 130° C.).

The entire mixture was stirred at 180° C. for an hour until homogeneous.

The composition obtained had the following properties:

| | |
|---|---|
| Softening point, ring and ball: | 141° C. |
| Needle penetration 100/25/5: | 14 × 0.1 mm |
| Melt viscosity at 190° C. | 8000 mPas. |

1.2 Hotmelt 2

1.2.a The following substances were mixed under an inert gas atmosphere as under 1.1.a:

50 parts by weight of a silane-modified propene-rich poly-α-olefin b) having a melt viscosity of 5000 mPas/190° C. (VESTOPLAST® 206; 25° C. needle penetration of 19 0.1 mm; softening point 98° C.), 30 parts by weight of a substantially amorphous propene-rich poly-α-olefin a) having a melt viscosity of 8000 mPas/190° C. (VESTOPLAST® 708; 25° C. needle penetration of 20 0.1 mm; softening point 106° C.), 20 parts by weight of an aliphatic hydrocarbonaceous resin c) (ESCOREZ® 5320; viscosity 2000 mPas/175° C.; softening point 125° C.).

The composition obtained had the following properties:

| | |
|---|---|
| Softening point, ring and ball: | 96° C. |
| Needle penetration 100/25/5: | 20 × 0.1 mm |
| Melt viscosity at 190° C. | 4000 mPas. |

2. Backfixing of Artificial Turf Stock Material

Test 1:

The tufted artificial turf stock material used was composed of polypropene ribbon material having a woven polypropylene backing and a total weight of 1250 g/m². To lock the ribbon pile tufts in the backing, the backside of the artificial turf was coated with the hotmelt 1 described above. The precoat material was applied to the backside of the artificial turf web by means of a hot knife doctor at 160° C. which cooperated with a heated roll. The temperature of the hotmelt was 160° C., the coating speed 5 m/min and the add-on weight 1000 g/m².

The backfixing operation served to lock the ribbon pile tufts to the woven backing. The tuft bind was 4 kg/tuft after 1 day.

Test 2:

The tufted artificial turf stock material used was composed of polyethylene ribbon material having a woven polyester backing and a total weight of 1450 g/m². To lock the ribbon pile tufts in the backing, the backside of the artificial turf was coated with the hotmelt 2 described above. The precoat material was applied to the backside of the artificial turf web by means of a hot knife doctor at 160° C. which cooperated with a heated roll. The temperature of the hotmelt was 150° C., the coating speed 5 m/min and the add-on weight 600 g/m².

The ribbon pile tufts were locked to the woven backing. The tuft bind was 3.9 kg/tuft after 1 day and 4.9 kg/tuft after 5 days.

We claim:

1. An artificial turf stock material, comprising: a hotmelt comprising:
    a) from 5% to 95% by weight of at least one amorphous poly-α-olefin,
    b) from 0% to 100% by weight of at least one modified amorphous poly-α-olefin,
    c) from 0% to 40% by weight of at least one resin,
    d) from 5% to 15% by weight of at least one modified crystalline polypropylene,
    e) from 0% to 20% by weight of at least one crystalline polyolefin,
    f) from 0% to 80% by weight of filler or pigment,
    g) from 0% to 20% by weight of at least one flame retardant, and
    h) from 0% to 20% by weight of at least one wax,
    wherein ribbon yarn of polyethylene, polypropene, polyester, polyamide, or an interpolymer is bound together with said hotmelt in an artificial turf stock material.

2. The artificial turf stock material according to claim 1, wherein said at least one amorphous poly-α-olefin a) is selected from the group consisting of atactic polypropylene, atactic poly-1-butene, a propene-ethene copolymer, a propene-1-butene copolymer, a 1-butene-ethene copolymer, and a propene-1-butene-ethene terpolymer.

3. The artificial turf stock material according to claim 1, wherein said amorphous poly-α-olefin a) has a softening point between 70 and 165° C., a melt viscosity of from 2000 and 200 000 mPa.s at 190° C., a density of less than 0.90 g/cm3 and a needle penetration between 3 and 50×0.1 mm.

4. The artificial turf stock material according to claim 1, wherein the modified amorphous poly-α-olefin b) is an amorphous poly-α-olefin having a maleic anhydride functionalization, a silane functionalization, or both.

5. The artificial turf stock material according to claim 1, wherein said modified amorphous poly-α-olefin b) is present in an amount of from 5% to 100% by weight.

6. The artificial turf stock material according to claim 1, wherein said at least one modified amorphous poly-α-olefin b) is selected from the group consisting of silane-modified polypropylene; silane-modified poly-1-butene; a silane-modified propene-ethene copolymer; a silane-modified propene-1-butene copolymer; a silane-modified 1-butene-ethene copolymer; a silane-modified propene-1-butene-ethene terpolymer; a maleic anhydride modified propene-ethene copolymer; a maleic anhydride modified polypropylene; a maleic anhydride modified propene-1-butene copolymer; a maleic anhydride modified 1-butene-ethene copolymer; and a maleic anhydride modified propene-1-butene-ethene terpolymer.

7. The artificial turf stock material according to claim 1, wherein said at least one resin c) is selected from the group consisting of a natural terpene resin; a synthetic terpene resin; a modified terpene resin; a rosin; a coumarone-indene resin; an aliphatic hydrocarbonaceous resin; aliphatic-aromatic hydrocarbonaceous resin; a aromatic-modified hydrocarbonaceous resin; a liquid resin; a hydrogenated cyclic hydrocarbonaceous resin; and
an ester resin.

8. The artificial turf stock material according to claim 7, wherein said ester resin is a fully or partially hydrogenated rosin glyceryl ester resin; a hydrogenated pentaerythrityl ester of a rosin; or both.

9. The artificial turf stock material according to claim 1, wherein said at least one resin c) is present in an amount of from 0.1% to 35% by weight.

10. The artificial turf stock material according to claim 1, wherein said at least one modified crystalline polypropylene d) is crystalline polypropylene modified with maleic anhydride or crystalline polypropylene modified with (meth) acrylic acid.

11. The artificial turf stock material according to claim 1, wherein said at least one crystalline polyolefin e) is present in an amount of from 1% to 15% by weight.

12. The artificial turf stock material according to claim 1, wherein said at least one crystalline polyolefin e) is selected from the group consisting of isotactic polypropylene; isotactic poly-1-butene; a propene-1-butene copolymer; an ethene-propene random copolymer; and an ethene-propene block copolymer.

13. The artificial turf stock material according to claim 1, wherein said filler or pigment f) is present in an amount of from 0.05% to 70% by weight.

14. The artificial turf stock material according to claim 1, wherein said filler or pigment is selected from the group consisting of carbon black; calcium carbonate; barium sulfate; aluminum oxide; aluminum hydroxide; magnesium hydroxide; graphite; an organic color pigment; an inorganic color pigment; white pigment; or a combination thereof.

15. The artificial turf stock material according to claim 1, wherein said at least one flame retardant g) is present in an amount of from 0.05% to 10% by weight.

16. The artificial turf stock material according to claim 1, wherein said at least one wax h) is present in an amount of from 0.1% to 15% by weight.

17. The artificial turf stock material according to claim 1, wherein said at least one wax h) is Fischer-Tropsch wax or polyethylene paraffin.

18. The artificial turf stock material according to claim 1, wherein the at least one amorphous poly-α-olefin a) has the monomer composition:
from 0.1% to 15% by weight of ethene, from 20% to 95% by weight of propene, and from 0.1% to 80% by weight of a linear α-olefin monomer having from 4 to 20 carbon atoms, a branched a-olefin monomer having from 4 to 20 carbon atoms, or both.

19. The artificial turf stock material according to claim 18, wherein the α-olefin is selected from the group consisting of 1-butene, 1-pentene, 1-hexene, 1-heptene, 1-octene, 1-decene, 1-dodecene, and 1-octadecene.

20. A process for backfixing of artificial turf stock material, comprising applying a hotmelt according to claim 1, to the backside of the artificial turf stock material.

21. The process according to claim 1, wherein the hotmelt is applied as a melt uniformly to the backside of the artificial turf stock material so as to obtain an add on weight in the range from 100 to 2000 g/m2, and the melt viscosity of the coating composition at 190° C. is from 300 mPa.s to 30 000 mPa.s.

22. The artificial turf stock material according to claim 1, wherein said amorphous poly-α-olefin a) has a softening point between 70 and 165° C., a melt viscosity of from 8000 and 200 000 mPa.s at 190° C., a density of less than 0.90 g/cm3 and a needle penetration between 14 and 50×0.1 mm.

* * * * *